(12) United States Patent
Meyer

(10) Patent No.: US 7,143,545 B2
(45) Date of Patent: Dec. 5, 2006

(54) SECURITY BAR WITH MULTIPLE INTERNAL ROLLING BARS AND ELECTRONIC MONITORING

(75) Inventor: John Allen Meyer, Charlotte, NC (US)

(73) Assignee: Lucent Technologies Inc., Murray Hill, NJ (US)

( * ) Notice: Subject to any disclaimer, the term of this patent is extended or adjusted under 35 U.S.C. 154(b) by 444 days.

(21) Appl. No.: 10/745,884

(22) Filed: Dec. 26, 2003

(65) Prior Publication Data

US 2005/0146217 A1    Jul. 7, 2005

(51) Int. Cl.
*E05B 47/00* (2006.01)
(52) U.S. Cl. .................. 49/15; 49/16; 49/17; 49/18; 49/19; 49/20
(58) Field of Classification Search ........... 49/15–20
See application file for complete search history.

(56) References Cited

U.S. PATENT DOCUMENTS

| | | | |
|---|---|---|---|
| 1,491,046 A * | 4/1924 | Kendrick | 384/548 |
| 5,267,688 A | 12/1993 | Benefield | 232/17 |
| 5,340,172 A | 8/1994 | Sweet | 292/259 |
| 5,678,871 A | 10/1997 | Zarzycki | 292/346 |
| 5,791,173 A | 8/1998 | Montes | 70/101 |
| 5,893,594 A | 4/1999 | Zarzycki | 292/346 |
| 6,619,079 B1 | 9/2003 | Cheung | 70/57.1 |
| 6,634,681 B1 | 10/2003 | Redden | 292/92 |
| 2005/0024210 A1 * | 2/2005 | Maki | 340/566 |

FOREIGN PATENT DOCUMENTS

EP    0 970 289 B1    8/2003

\* cited by examiner

Primary Examiner—Brian Sircus
Assistant Examiner—Dru Parries
(74) Attorney, Agent, or Firm—Kenneth M. Brown

(57) ABSTRACT

A security bar providing improved security from breach is obtained with the use of a plurality of free rolling inner bars. Illustratively, three inner rolling bars, arranged in a triangular relationship, are provided inside a cylindrically hollowed out outer bar, thereby ensuring that no inner bar can be attacked simultaneously from opposing sides thereof. The inner bars may be surrounded with a ring of ball bearings to provide for their ability to roll freely in place with respect to the outer bar. Electronic monitoring of the security bar identifies attempts to breach the security bar.

11 Claims, 1 Drawing Sheet

US 7,143,545 B2

SECURITY BAR WITH MULTIPLE INTERNAL ROLLING BARS AND ELECTRONIC MONITORING

FIELD OF THE INVENTION

The present invention relates generally to the field of security and more particularly to a security bar providing improved security from breach with use of, for example, a hacksaw.

BACKGROUND OF THE INVENTION

Most security bars, such as those used in prisons, stores' or banks' barred windows, and auto theft devices such as, for example, the Club® (a registered trademark of Winner International Royalty LLC), are one solid bar made of an appropriately strong metal such as iron. Most typically, the biggest threat to the breach of security of a security bar is a hacksaw or similar tool, which is used to cut completely through the security bar, thereby rendering it useless.

One approach that has been suggested is to insert a free rolling internal metal bar inside an outer metal bar which has been fabricated in the form of a hollowed out cylinder. Thus, using a hacksaw, for example, to saw through one side of the bar will be fruitless—once the hacksaw encounters the free rolling inner bar, the inner bar will simply roll back and forth along with the movement of the hacksaw, and will therefore not be cut at all.

However, a security bar fabricated with the above described approach can nonetheless be breached by using two hacksaws in concert. In particular, the two hacksaws may be used to cut simultaneously on opposite sides of the security bar, sawing in the same direction with equal pressure. In this manner, once the outer bar has been cut through and the inner bar reached, the inner bar will not be able to roll, but rather, will also be cut by the two hacksaws working together.

Therefore, it would be highly desirable to provide a security bar which cannot be breached, even with the use of multiple hacksaws. In addition, it would be highly desirable to provide such a security bar whose breach or attempted breach can be monitored automatically (e.g., electronically).

SUMMARY OF THE INVENTION

In accordance with the principles of the present invention, a security bar providing improved security from breach is obtained with the use of a plurality of free rolling inner bars so that simultaneous "attack" from opposing sides of the inner bars cannot be easily achieved. In particular, and in accordance with one illustrative embodiment of the present invention, three inner rolling bars, arranged in a triangular relationship, are provided inside a cylindrically hollowed out outer bar, thereby ensuring that no inner bar can be attacked simultaneously from opposing sides thereof. Illustratively, each of these inner bars may be advantageously surrounded with a ring of ball bearings to provide for their ability to roll freely in place with respect to the outer bar.

Moreover, in accordance with certain illustrative embodiments of the present invention, electronic monitoring of the security bar is provided, to thereby identify when an attempt to breach the security bar occurs. For example, in accordance with one such illustrative embodiment, electrical contacts provided on the individual inner rolling bars may be advantageously employed to determine when one or more of the inner bars have in fact changed their position (i.e., rotated). And in accordance with another such illustrative embodiment, a thermocouple may be provided inside the security bar to determine when breach of the security bar is being attempted with use of extreme heat (e.g., with a blowtorch).

DETAILED DESCRIPTION OF THE ILLUSTRATIVE EMBODIMENTS

Figure 1:
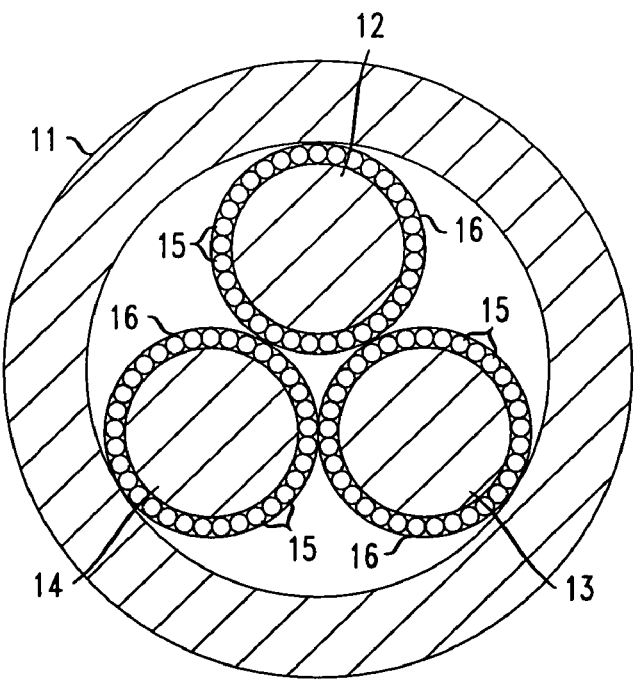
FIG. 1 shows a security bar in accordance with an illustrative embodiment of the present invention in which breach by multiple hacksaws is advantageously defeated.

FIG. 1 shows a security bar in accordance with an illustrative embodiment of the present invention in which breach by multiple hacksaws is advantageously defeated. The illustrative security bar shown comprises an elongated structure which is being viewed in cross-section (e.g., from a hypothetical position at one end of the elongated bar, looking "down into" the inside of the bar).

Specifically, the security bar of FIG. 1 comprises an elongated outer member—outer bar 11—which is advantageously hollowed out so as to create an elongated cylindrical inner cavity within. This cavity illustratively comprises three elongated inner cylindrical members—inner bar 12, inner bar 13 and inner bar 14—positioned in a triangular arrangement. Each of these inner bars is advantageously surrounded, at one or more locations along their lengths, by circular rings 16 each comprising a plurality of ball bearings 15 arranged in a circular pattern around the corresponding inner bar. In this way, each of the inner bars is advantageously enabled to rotate freely with respect to the outer bar and independently of each other.

As can be seen from the figure, the illustrative security bar is protected from breach by even a pair of hacksaws. Any attempt to saw through the entire bar will be defeated because each of the inner bars will advantageously rotate if reached by a saw, and since it will not be possible to simultaneously attack opposing sides of any of the bars, this rotation cannot be inhibited.

Figure 2:
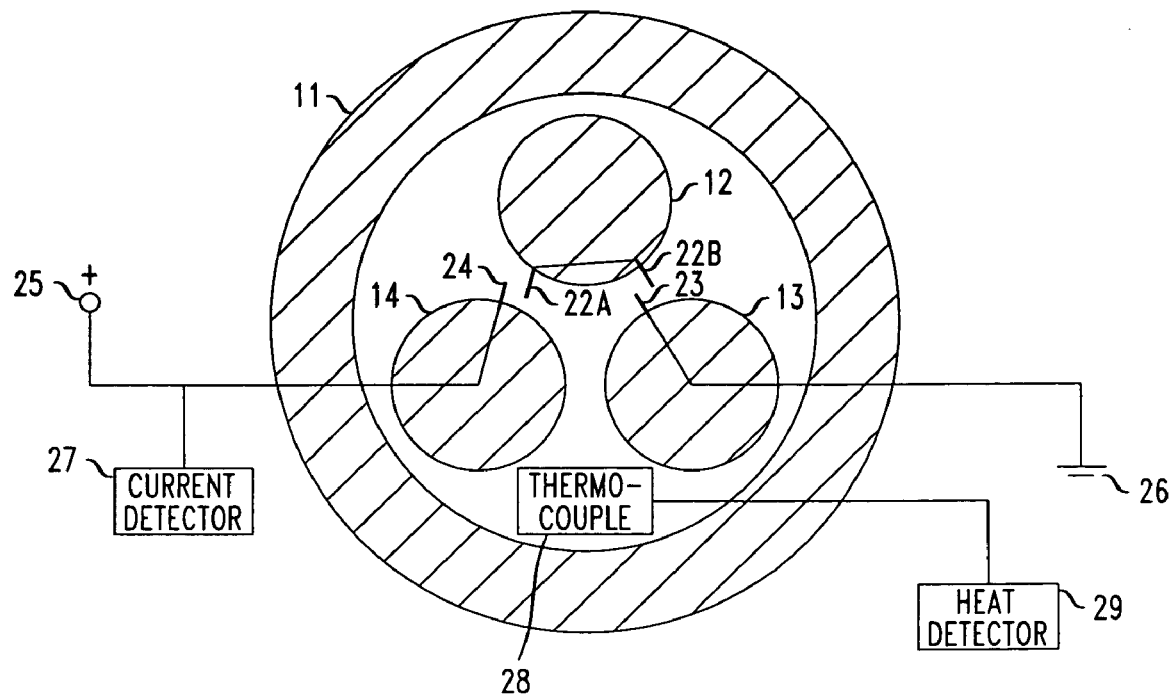
FIG. 2 shows a security bar in accordance with an illustrative embodiment of the present invention in which an attempted breach may be advantageously detected electronically.

FIG. 2 shows a security bar in accordance with an illustrative embodiment of the present invention in which an attempted breach may be advantageously detected electronically. Again, as in FIG. 1, the illustrative security bar shown comprises an elongated structure which is being viewed in cross-section (e.g., from a hypothetical position at one end of the elongated bar, looking "down into" the inside of the bar). Similar elements of the illustrative security bar as between FIG. 1 and FIG. 2 are shown with like identifying numbers. Note that the illustrative rings and ball bearings of FIG. 1 are omitted from the drawing of FIG. 2 for purposes of clarity, although they may assumed to be advantageously present, albeit preferably at a cross-sectional position other than the one being explicitly shown in FIG. 2.

Specifically, the security bar of FIG. 2, like that of FIG. 1, comprises an elongated outer member—outer bar 11—which is advantageously hollowed out so as to create an elongated cylindrical inner cavity which, in turn, comprises three elongated inner cylindrical members—inner bar 12, inner bar 13 and inner bar 14—positioned in a triangular arrangement. In addition, however, each of the inner bars have attached thereto and protruding therefrom one or more electrical contacts. These contacts may, for example, comprise electrical brush contacts, fully familiar to those of ordinary skill in the art, or they may comprise any other mechanism by which electrical contact can be provided between the inner bars when they are in a given rotational alignment with each other. (Note that these contacts may also be "fixed" electrical contacts such as, for example, wires, for which rotation of the inner bars can cause a "permanent" break to occur. Of course, this would require replacement or repair of the security bar in the event of an attempted breach.)

In particular, and in accordance with the illustrative embodiment of the present invention shown in FIG. 2, inner bar 12 advantageously comprises two protruding electrical contacts—contacts 22A and 22B, while each of inner bars 13 and 14 comprise one protruding electrical contact—contacts 23 and 24, respectively. Moreover, contact 24 of inner bar 14 is electrically connected to electrical voltage source 25 (e.g., a battery or other power source), while contact 23 of inner bar 13 is electrically connected to electrical ground 26. In addition, contacts 22A and 22B are electrically connected to each other. (In one alternative illustrative embodiment of the present invention, the inner bars may be made of an electrically conducting material. In such an embodiment, therefore, the electrical connection between contacts 22A and 22B is implicit, as are the portions of the electrical connections leading from contact 24 to electrical voltage source 25 and contact 23 to electrical ground 26 which are internal to inner bars 14 and 13, respectively.) Finally, current detector 27 is connected (e.g., in parallel) to the electrical connection leading from electrical voltage source 25.

Operationally, inner bars 12, 13 and 14 of the illustrative security bar of FIG. 2 are initially positioned such that (i) contact 22A and contact 24 are in physical (and therefore electrical) contact, and (ii) contact 22B and contact 23 are also in physical (and therefore electrical) contact. (Note that this is not the position shown in FIG. 2—see below.) In this way, current will advantageously flow from electrical voltage source 25 to electrical ground 26. (Resistance, in the form of, for example, a physical resistor, may be advantageously inserted in the current path from electrical voltage source 25 to electrical ground 26 if necessary to limit the amount of current flow.)

As shown in FIG. 2, however, neither contacts 22A and 24 nor contacts 22B and 23 are, in fact, physically (and therefore electrically) connected to each other. This may, for example, have resulted from the (slight) counterclockwise rotation of inner bar 12, or, alternatively, from the (slight) counterclockwise rotation of both inner bar 13 and inner bar 14. As such, the current flow from electrical voltage source 25 to electrical ground 26 will be interrupted. As a result, current detector 27 advantageously detects that current has stopped flowing, and thereby determines that at least one of the bars must have been rotated—an indication that an attempted breach of the security bar has likely taken place.

Finally, the illustrative security bar of FIG. 2 also comprises thermocouple 28, physically positioned, for example, within the cavity of outer member 11. Thermocouple 28 is electrically connected to (external) heat detector 29. Thus, if an attempt is made to breach the security bar with extreme heat (e.g., a blowtorch), thermocouple 28 will advantageously detect the presence of such heat, generating an electrical signal which is fed to heat detector 29, which thereby identifies that an attempted breach of the security bar by heat has likely taken place.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope.

For example, although the illustrative embodiments of the present invention shown in FIGS. 1 and 2 comprise exactly three inner bars, it will be appreciated by those skilled in the art that certain advantageous effects of the present invention may be achieved with use of any other plural numbers of inner bars as well. In addition, it will be obvious to those skilled in the art that arrangements other than the triangular arrangement shown in the figures may also be used. Further, in accordance with other illustrative embodiments of the invention, the inner bars may be held in position (yet permitted to roll substantially freely with respect to the outer bar) with the use of numerous and varied techniques other than the use of ball bearing rings such as are shown in FIG. 1, all of which will be obvious to those skilled in the art.

With respect to the electronic monitoring feature of the present invention, it will also be appreciated that numerous other approaches, all obvious to those of ordinary skill in the art, can be used to determine whether the security bar of the present invention has been breached, or that an attempted breach has occurred. For example, by running current lengthwise through either the outer bar or one or more of the inner bars (or both), any successful attempt at cutting through the security bar will necessarily cut off the flow of current and can thereby be used to identify a breach. (Clearly, however, the illustrative embodiment described above in connection with FIG. 2 would most likely be preferred, since it advantageously identifies an attempt at breach well before the security bar has actually been compromised.)

In addition, any of a number of mechanisms, also obvious to those skilled in the art, can be used to identify which of a (possibly large) plurality of security bars is "under attack" (i.e., breached or has had an attempted breach). For example, in a prison using electronically monitored security bars in accordance with one of the many illustrative embodiments of the present invention, the electrical signals (indicating breach or attempted breach) from all of the security bars so wired may be advantageously used to supply a central circuit, preferably located at a central monitoring location such as a security booth, designed not only to determine that a breach or attempted breach has occurred, but also to identify, for example, which particular prison cell may be under such an attack.

Finally, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

I claim:

1. A security bar comprising:
   an elongated outer member, said outer member having a longitudinally hollowed out cylindrical interior;
   a plurality of elongated inner cylindrical members, each of said inner members positioned longitudinally within the hollowed out interior of the outer member, each of the inner members adapted to roll substantially freely with respect to the outer member; and
   a plurality of ball bearing rings corresponding to the plurality of elongated inner cylindrical members, each ball bearing ring comprising a plurality of ball bearings positioned in a circular arrangement, and each ball bearing ring associated with and surrounding the elongated inner cylindrical member corresponding thereto.

2. The security bar of claim 1 comprising three elongated inner cylindrical members positioned in a triangular arrangement.

3. The security bar of claim 2 wherein each of said ball bearing rings surrounding said three elongated inner cylindrical members is positioned in contact with the cylindrical interior of the outer member and with each of the other two of said ball bearing rings.

4. A security bar comprising:
   an elongated outer member, said outer member having a longitudinally hollowed out cylindrical interior;
   a plurality of elongated inner cylindrical members, each of said inner members positioned longitudinally within the hollowed out interior of the outer member, each of the inner members adapted to roll substantially freely with respect to the outer member; and
   an electrical circuit connected to at least one of said inner cylindrical members, the electrical circuit adapted for use in detecting an attempt to breach the security bar, wherein said electrical circuit comprises an electrical voltage source, an electrical ground, and an electric current detector, and wherein said attempt to breach the security bar is detected based on said electric current detector having determined a lack of current flow through said electrical circuit.

5. The security bar of claim 4 wherein each of two or more of said inner cylindrical members includes one or more electrical contacts protruding therefrom, at least one of said electrical contacts protruding from a first one of said inner cylindrical members being in physical contact with at least one of said electrical contacts protruding from a second one of said inner cylindrical members when said first and second inner cylindrical members are positioned in a first rotational orientation therebetween.

6. The security bar of claim 5 wherein the electrical contacts protruding from said inner cylindrical members comprise electrical brush contacts.

7. The security bar of claim 5 wherein a current flow is present in said electrical circuit when said at least one of said electrical contacts protruding from said first one of said inner cylindrical members is in physical contact with said at least one of said electrical contacts protruding from said second one of said inner cylindrical members, and wherein a current flow is not present in said electrical circuit when said at least one of said electrical contacts protruding from said first one of said inner cylindrical members is not in physical contact with said at least one of said electrical contacts protruding from said second one of said inner cylindrical members.

8. The security bar of claim 7 comprising three elongated inner cylindrical members positioned in a triangular arrangement,
   wherein a first one of said inner cylindrical members comprises one electrical contact protruding therefrom, a second one of said inner cylindrical members comprises one electrical contact protruding therefrom, and a third one of said inner cylindrical members comprises two electrical contacts protruding therefrom, and
   wherein said electrical contact protruding from said first inner cylindrical member is in physical contact with one of said two electrical contacts protruding from said third inner cylindrical member, and said electrical contact protruding from said second inner cylindrical member is in physical contact with another one of said two electrical contacts protruding from said third inner cylindrical member, when said three inner cylindrical members are positioned in a first rotational orientation therebetween.

9. The security bar of claim 8 wherein said electrical contact protruding from said first inner cylindrical member is electrically connected to said electrical voltage source, said electrical contact protruding from said second inner cylindrical member is electrically connected to said electrical ground, and said two electrical contacts protruding from said third inner cylindrical member are electrically connected to each other.

10. A security bar comprising:
    an elongated outer member, said outer member having a longitudinally hollowed out cylindrical interior;
    a plurality of elongated inner cylindrical members, each of said inner members positioned longitudinally within the hollowed out interior of the outer member, each of the inner members adapted to roll substantially freely with respect to the outer member; and
    a thermocouple for use in detecting an attempt to breach the security bar by applying heat thereto.

11. The security bar of claim 10 wherein said thermocouple is located within said hollowed out interior of said outer member.

* * * * *